(12) United States Patent
Hennebert

(10) Patent No.: US 11,050,563 B2
(45) Date of Patent: Jun. 29, 2021

(54) METHOD OF EXCHANGING KEYS BY SMART CONTRACT IMPLEMENTED ON A BLOCKCHAIN

(71) Applicant: COMMISSARIAT A L'ENERGIE ATOMIQUE ET AUX ENERGIES ALTERNATIVES, Paris (FR)

(72) Inventor: Christine Hennebert, La Tronche (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 379 days.

(21) Appl. No.: 16/234,020

(22) Filed: Dec. 27, 2018

(65) Prior Publication Data
US 2019/0207760 A1 Jul. 4, 2019

(30) Foreign Application Priority Data
Dec. 29, 2017 (FR) ..................................... 17 63394

(51) Int. Cl.
*H04L 9/08* (2006.01)
*H04L 9/32* (2006.01)
*G06Q 20/36* (2012.01)
*G06Q 20/40* (2012.01)

(52) U.S. Cl.
CPC ....... *H04L 9/0894* (2013.01); *G06Q 20/3672* (2013.01); *G06Q 20/405* (2013.01); *H04L 9/0841* (2013.01); *H04L 9/3239* (2013.01); *H04L 2209/38* (2013.01)

(58) Field of Classification Search
CPC ... H04L 9/0894; H04L 9/0841; H04L 9/3239; G06Q 20/3672
See application file for complete search history.

(56) References Cited

U.S. PATENT DOCUMENTS

| 2019/0081796 A1* | 3/2019 | Chow | H04L 9/30 |
| 2020/0162259 A1* | 5/2020 | Wang | H04L 9/3263 |
| 2020/0259640 A1* | 8/2020 | Leavy | H04L 9/32 |

OTHER PUBLICATIONS

French Preliminary Search Report dated Aug. 6, 2018 in French Application 17 63394 filed on Dec. 29, 2017 (with English Translation of Categories of Cited Documents).
McCorry, P. et al. "Authenticated Key Exchange over Bitcoin," School of Computing Science, Newcastle University, 2015, pp. 18.
Sivakumar, P. "Privacy based decentralized public key infrastructure (PKI) implementation using smart contract in blockchain" National Institute of Technology, 2017, pp. 6.

(Continued)

*Primary Examiner* — Ali S Abyaneh
*Assistant Examiner* — Shu Chun Gao
(74) *Attorney, Agent, or Firm* — Oblon, McClelland, Maier & Neustadt, L.L.P.

(57) ABSTRACT

This invention relates to a Diffie-Hellmann type method of exchanging keys between peers, authenticated by means of a blockchain and capable of storing smart contracts in the distributed ledger. The key exchange is then made by means of such a contract in which the peers are declared. Each of the peers calls the contract and the contract saves their wallet addresses. When called by the addressee peer, and after verifying the address of the addressee peer, the contract delivers the public key generated by the sending peer to the addressee peer.

6 Claims, 2 Drawing Sheets

(56) References Cited

OTHER PUBLICATIONS

Kyogoku, T. et al. "A note on authenticated key exchange in cryptocurrency," SCIS, The Institute of Electronics, Information and Communication Engineers, 2016, pp. 8.
Thanh, B. et al. "Key exchange with the help of a public ledger", Springer International Publishing AG, 2017, pp. 14.
Antonopoulos, A. "Mastering Bitcoin," O'Reilly Media Inc., 2014, pp. 274.
U.S. Appl. No. 16/233,974, filed Dec. 27, 2018, US 2019/0207757 A1, Christine Hennebert.

* cited by examiner

METHOD OF EXCHANGING KEYS BY SMART CONTRACT IMPLEMENTED ON A BLOCKCHAIN

TECHNICAL DOMAIN

The present invention relates to cryptography in general and more particularly to generation of a secure channel between peers using a secret key. It also relates to the blockchain technique.

STATE OF PRIOR ART

Generation of a secure channel between remote devices, also called "peers" in the following, assumes that a secret key is shared between these devices. This sharing may be done by a manual distribution of keys before any communication on the channel, or using a Diffie-Hellmann type key exchange protocol using an asymmetric cryptosystem. Remember that in a Diffie-Hellman type key exchange protocol, each remote device has a pair of asymmetric keys (private key, public key). The private key of a sending device is kept secret by the sender and in particular is never divulged to the receiving device. It is used to encrypt or sign messages and to identify the sending device. On the other hand, the public key is known to the receiving device and is used to decrypt messages or to check the signature of the sending device. The purpose of the key exchange protocol is to enable each remote device to calculate the same secret key independently that will be used to establish a secure channel between them, making use of public elements of a cryptosystem exchanged on an unsecured channel.

When the cryptosystem is based on an elliptical curve $E$ ($F_q$) defined on a finite field $F_q$ and characterised by domain parameters (q,a,b,G,n,h) in which q is the number of elements in the field, a,b are parameters of the elliptical curve, G is a generating point, n is the order of G in the additive group $E(F_q)$, $$h = \frac{|E(F_q)|}{n}$$

is the cofactor of G in this group, $|E(F_q)|$ is the order of the group $E(F_q)$. Each remote device can choose a private key sk among integers[1,n−1], the corresponding public key being given by the coordinates of the pointPk=sk·G. Remember that searching sk from Pk is equivalent to searching for a solution to the ECLDP (Elliptic Curve Discrete Logarithm Problem) problem, which is currently impossible to solve in polynomial time.

If Alice and Bob are the two peers corresponding to two remote devices, a Diffie-Hellmann key exchange protocol using an elliptical cryptosystem (ECDH protocol) can be described by the following steps:

Alice chooses an integer number a that will remain secret, calculates the ephemeral public key, $P_b$=b·G, and sends it to Bob.

Similarly, Bob chooses an integer b that will remain secret, calculates the ephemeral public key, $P_b$=b·G, and sends it to Alice.

On reception of $P_b$, Alice calculates a·$P_b$=ab·G.
On reception of $P_a$, Bob calculates b·P=ba·G.
Alice and Bob now share a secret element forming a point on the elliptical curve, ab·G. For example, they can apply a hash function previously agreed to between themselves, to one of the coordinates of the point concerned to obtain a symmetric session key with which they encrypt data on the channel.

An important limitation to the key exchange protocol described above is that it is not immune to a Man-In-the-Middle type attack. Indeed, an attacker, Eve, can interpose between Alice and Bob and make Alice believe that she is making exchanges with Bob and Bob that he is making exchanges with Alice. In applying the protocol described above, Eve chooses a first integer x and shares a first secret element axG with Alice, then chooses a second integer y and shares a second secret element byG with Bob. Eve can thus create a first secure channel with Alice and a second secure channel with Bob. When Alice believes she is securely sending data to Bob, she is actually providing data to Eve. And correspondingly, when Bob believes he is securely sending data to Alice, he is also sending data to Eve.

One known solution to prevent this type of attack is to identify the sender of each public key. Thus, Alice sends not only her ephemeral public key $P_a$=a·G to Bob but she also sends a digital signature of $P_a$, signed with her private key (for example using an ECDSA algorithm). Bob must then have Alice's public key to check the signature in question. If the check is positive, then it is known that the ephemeral public key was sent by Alice and not by a third party. Obviously, correspondingly, Bob sends his ephemeral public key P=b·G to Alice accompanied by the signature of $P_b$ using Bob's private key, and Alice checks this signature using Bob's public key to authenticate the source of the ephemeral public key.

However, this solution is only partially satisfactory in that transmission of the public key from Alice to Bob (or Bob's key to Alice) on a non-secure channel is itself subject to a "Man-in-the-Middle" type attack. A digital certificate (in the X.509 format or an implicit certificate, for example) delivered by a certification authority is used to tie a sender's public key to his identity. The result is that the Diffie-Hellman protocol requires the presence of a trusted third party to be robust to "Man-in-the-Middle" type attacks.

In order to dispense with a trusted third party and in particular a centralised certification authority, it has been proposed to resort to a blockchain such as Bitcoin to carry out an exchange of keys according to the Diffie-Hellmann protocol. It will be recalled that a blockchain is a distributed and secure ledger of all the transactions made since the start of the chain. A complete introduction to the Bitcoin blockchain can be found in the work of A.M. Antonopoulos entitled "Mastering Bitcoin" published in 2015 by O'Reilly Media.

FIG. 1 represents such a method of exchanging keys authenticated by a blockchain.

Before the key exchange, it is assumed that Alice and Bob have each independently generated a private key (denoted a for Alice and b for Bob) and, starting from the corresponding public key ($P_a$=aG for Alice and $P_b$=bG for Bob), an ephemeral wallet address (denoted @wallet_a Alice for Alice and @wallet_b Bob for Bob). The ephemeral addresses will only be used for transactions that support this exchange. Bob's and Alice's wallets are also assumed to be credited with a sufficient amount of cryptocurrency.

Alice forms a transaction $T_a$ at 110 and this transaction is distributed to nodes in the Bitcoin network. After having been validated, incorporated into a block and confirmed by mining, it forms part of the distributed ledger. Similarly, Bob forms a transaction $T_b$ at 120 and this transaction is distributed to the network nodes step by step.

In general, a transaction represents a transfer of cryptocurrency units from one or several inputs to one or several outputs. A transaction is labelled in terms of UTXO (Unspent Transaction Output), each UTXO representing an amount not spent by its owner and being locked by a locking script. Before being able to spend a UTXO, the owner must identify himself by presenting cryptographic elements (generally the public key and a signature generated from the corresponding private key) to UTXO in the form of an unlocking script. If the elements presented in the unlocking script satisfy the conditions specified in the locking script, the transaction is validated. It will be noted that in Bitcoin, the most frequently used unlocking script is Pay-to-Public-Key-Hash (P2PKH) and the locking script is scriptSig.

The transaction $T_a$ formed by Alice comprises an input reference to a UTXO held at the wallet address @wallet_a Alice and an unlocking script (represented by a key). This unlocking script contains Alice's ephemeral public key, $P_a$ and a signature of this public key (more precisely of the transaction in which the public key $P_a$ is substituted for the unlocking script, the transaction then being doubly hashed) using the corresponding private key, a.

The output of the transaction $T_a$ comprises the wallet address of the recipient (Bob), namely @wallet_b Bob, together with a locking script (represented by a padlock on the figure) that Bob can unlock by providing cryptographic elements (public key and signature) in an unlocking script satisfying the conditions fixed in the locking script. This transaction creates a UTXO (@wallet_b Bob-amount) at Bob's ephemeral wallet address. The address of Alice's ephemeral wallet is also indicated at the output so that Alice can retrieve the balance of the transaction in her wallet (a UTXO is created in Alice's ephemeral wallet).

In the same way, the input to the transaction $T_b$ comprises a reference to a UTXO, held at wallet address @wallet_b Bob, and an unlocking script containing Bob's ephemeral public key, $P_b$, and a signature of this public key using the corresponding private key b.

The output of the transaction $T_b$ comprises Alice's ephemeral wallet address, @wallet_b Alice, and a locking script (represented by a padlock on the figure) that Alice can unlock by providing cryptographic elements satisfying the conditions fixed in the locking script. This output creates a UTXO (@wallet_a Alice-amount) at Alice's ephemeral wallet address. A second output is provided to retrieve the balance in the form of a UTXO at Bob's ephemeral wallet address.

The amounts of the @wallet_a Alice-montant and @wallet_b Bob-montant UTXOs can also be chosen to balance the exchange.

Once the transactions $T_a$ and $T_a$ have been validated and saved in the blockchain and confirmed by mining, Alice or Bob scans the distributed ledger to search for the transaction sent by Bob or Alice respectively. Alice recovers Bob's ephemeral public key $P_b$ in the input part of $T_b$, and conversely Bob recovers Alice's ephemeral public key $P_a$ in the input part of $T_a$. Alice then calculates $aP_b=abG$ and Bob calculates $bP_a=baG$: Consequently, Alice and Bob have the shared secret key $abG$.

Auditability of the distributed ledger enables all users (nodes) to verify that the ephemeral public keys used in this exchange have never been used previously, that the public key $P_a$ genuinely belongs to Alice (more precisely it is tied to Alice's ephemeral wallet address) and that the public key $P_b$ actually belongs to Bob (more precisely it is tied to Bob's ephemeral wallet address). Thus, the exchange of public keys between Alice and Bob can be authenticated by the blockchain, without any action by a trusted third party.

However, the systematic generation of ephemeral wallet addresses at each key exchange can be complicated to manage and expensive in terms of calculation resources for remote devices hosting these wallets.

The article of McCorry et al. entitled "Authenticated key exchange over Bitcoin" published in 2015 in Chen. L, Matsuo S. (eds.) Security Standardisation Research, Lecture Notes in Computer Science, vol. 9497, Springer, describes a method for exchanging keys using as ephemeral keys the keys that are used to sign the transactions. This method makes it possible to dispense with the generation of ephemeral wallet addresses but is on the other hand sensitive to attacks against ECDSA signatures.

An object of the present invention is consequently to propose a method for exchanging keys between peers, authenticated by blockchain and thus without resorting to a trusted third party, which does not require the generation of ephemeral wallets while being robust to cryptanalytic attacks.

PRESENTATION OF THE INVENTION

This invention is defined by a method of exchanging keys between a first user and a second user of a transaction blockchain, the blockchain being designed to store smart contracts, each user have a wallet address that he or she can use to send and receive transactions, the blockchain storing a smart contract comprising:

a first function (Fct A) having at least one public key as an argument and that, when it is called by a user, stores the wallet address of the user who calls it and the public key, as arguments;

a second function (Fct B) having at least one public key as an argument and that, when it is called by a user, checks that the wallet address of the user who calls it is the address of a user authorised for the exchange, and if so, stores the public key as an argument;

a third function (Fct C) comprising a first instruction verifying that the wallet address of the user who calls it is actually the wallet address stored by the first function and in this case returns the public key stored by the second function to the user, and a second instruction verifying that the wallet address of the user who calls it is actually the wallet address stored by the second function and in this case returns the public key stored by the first function to the user; and that (i) the first user generates a first ephemeral private key (a) and a corresponding first ephemeral public key ($P_a$) using an asymmetric cryptosystem;

(ii) the second user generates a second ephemeral private key (b) and a corresponding second ephemeral public key ($P_b$) using said asymmetric cryptosystem;

(iii) the first user forms a first transaction ($T_A$) containing the first ephemeral public key and sends it to the address of the smart contract, the wallet address of the first user and the first ephemeral public key then being stored in the smart contract, the block containing the smart contract then being mined;

(iv) the second user forms a second transaction ($T_B$) containing the second ephemeral public key and sends it to the address of the smart contract, the wallet address of the second user and the second ephemeral public key then being stored in the smart contract, the block containing the smart contract then being mined;

(v) the first user forms a request in the form of a third transaction and sends it to the address of the smart contract, the second instruction of the third function of the smart contract then returning the second ephemeral public key to it;

(vi) the second user forms a request in the form of a third transaction and sends it to the address of the smart contract, the second instruction of the third function of the smart contract then returning the first ephemeral public key to it;

(vii) the first user calculates the product of the first ephemeral private key (a) and the second ephemeral public key ($P_b$) and the second user calculates (232) the product of the second ephemeral private key (b) and the first ephemeral public key to generate a common secret key ($k_{ab}$).

The first function of the smart contract preferably comprises the wallet address of the user authorised for the exchange as a second argument and the first transaction sends the wallet address of the second user to the first function as a second argument.

Advantageously, to balance costs, when the smart contract returns the first ephemeral public key to the second user or the second ephemeral public key to the first user, the smart contract returns half the indicated amounts in the first and second transactions to the first and second users respectively.

The smart contract advantageously comprises a fourth function (Fct timeout) by which the first user can terminate the smart contract if the second user has not sent the second transaction to the smart contract within a predetermined time (timeout) after the first user has sent the first transaction to the smart contract.

The blockchain may for example by Hyperledger or Ethereum.

In the case of Ethereum, one of the first, second, third and fourth transactions may comprise a parameter (STARTGAS) fixing the maximum complexity that execution of the transaction is authorised to consume and a cost to be paid in terms of complexity (GASPRICE).

BRIEF DESCRIPTION OF THE DRAWINGS

Other characteristics and advantages of the invention will become clear after reading a preferred embodiment of the invention, given with reference to the appended figures among which.

DETAILED PRESENTATION OF PARTICULAR EMBODIMENTS

The basic concept of this invention is to make use of a blockchain in which smart contracts or autonomous contracts can be stored. Ethereum is one example of such a blockchain. Hyperledger is another example of such a blockchain.

A smart contract is a program that is deployed (in other words stored) in the blockchain and that can be executed by any node on the network. In general, a smart contract can store data, send and receive payments, store an amount in cryptocurrency (ether in Ethereum), and execute actions independently and in a decentralised manner as a software agent. In general, a smart contract verifies if a number of input conditions are satisfied, and if so, runs automatically to provide a coded result in the contract.

The smart contract described herein authenticates the parties and provide public keys to them accordingly.

Figure 1:
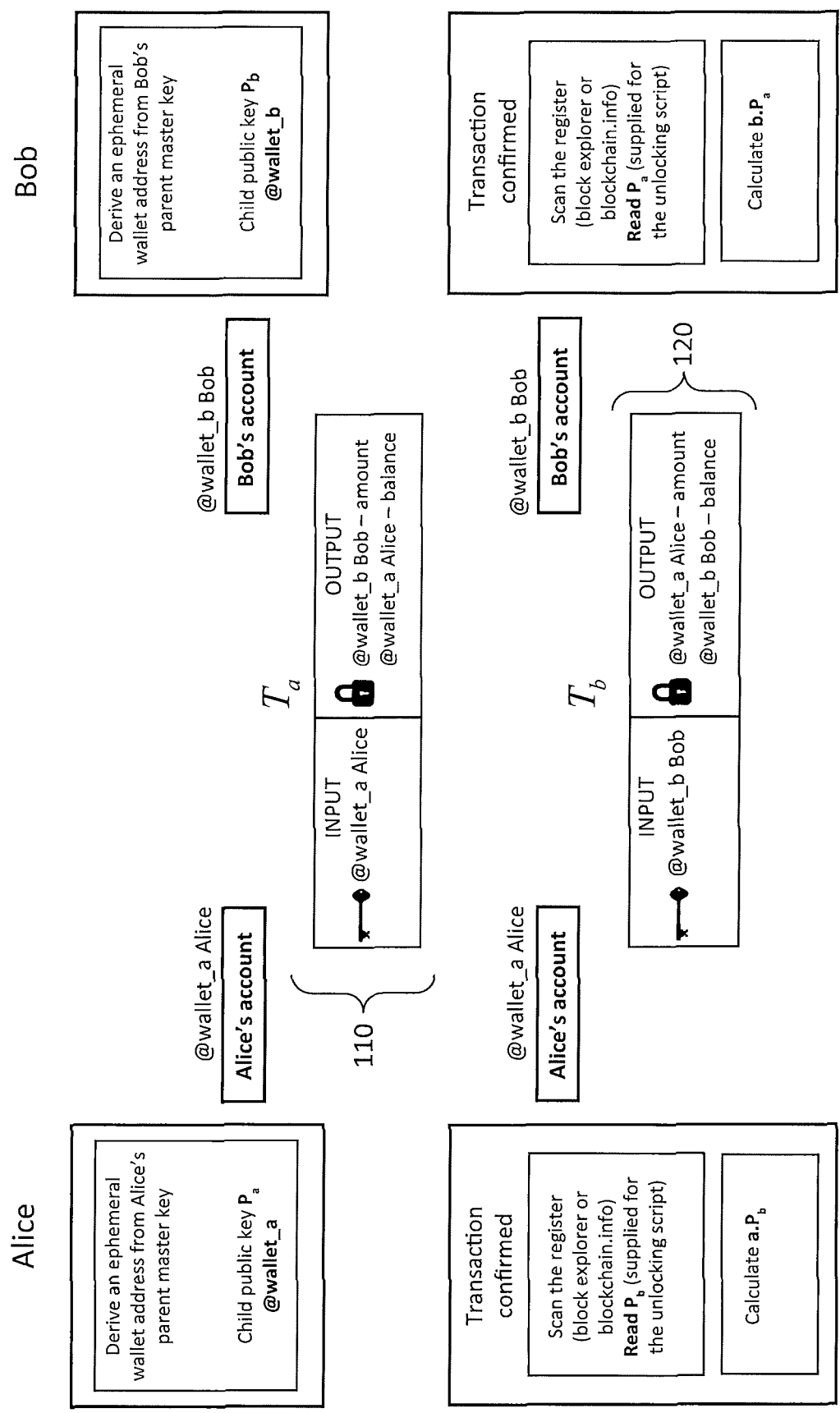
FIG. 1, already described, diagrammatically represents an exchange of keys between peers, authenticated by a blockchain using a method known in the prior art.
Figure 2:
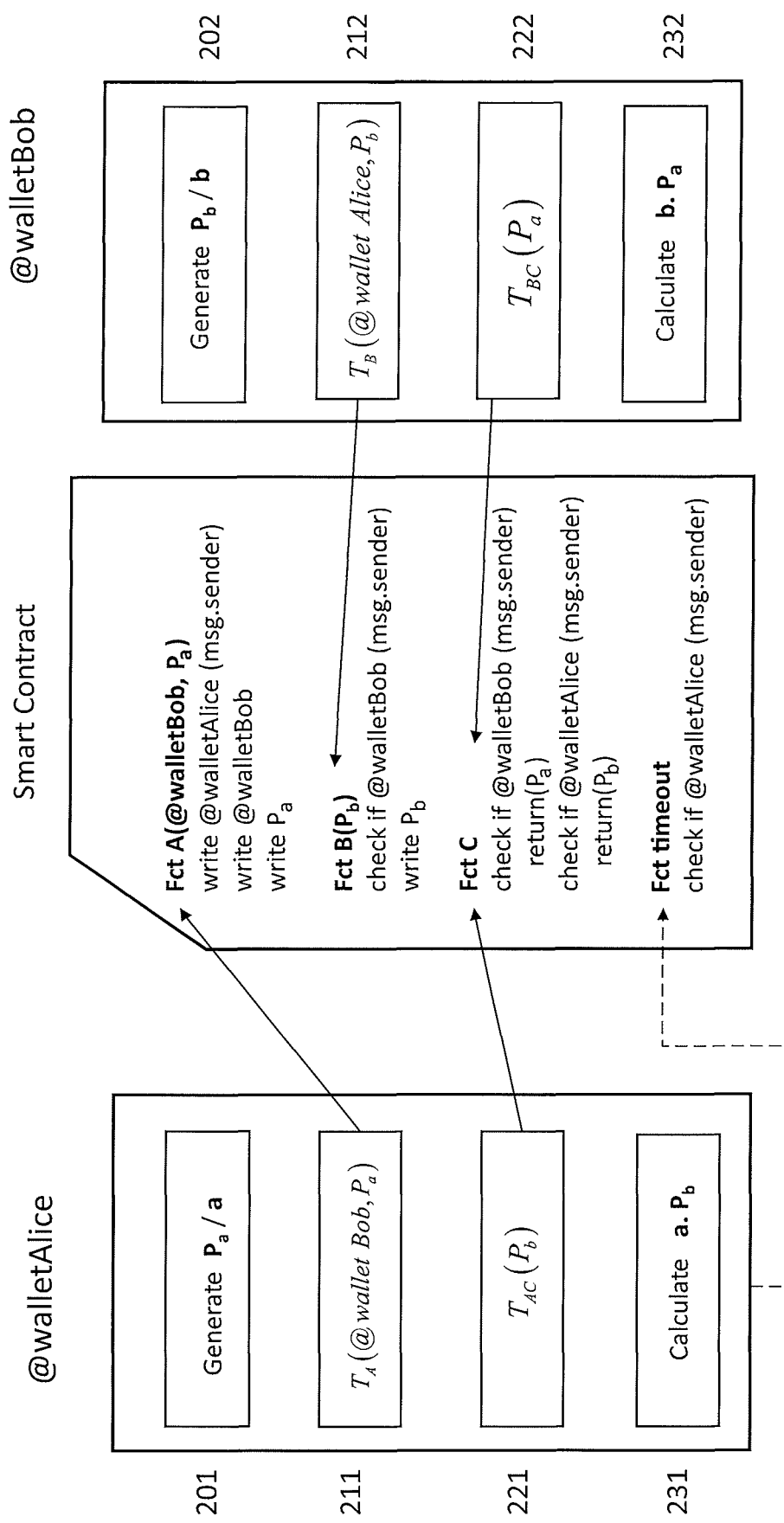
FIG. 2 diagrammatically represents an exchange of keys between peers, authenticated by a smart contract implemented on a blockchain, according to one embodiment of the invention.

FIG. 2 diagrammatically represents an exchange of keys between peers, by means of a smart contract implemented on a blockchain, according to one embodiment of the invention.

It is assumed that a first user (or a first peer) Alice, and a second user (or a second peer) Bob, each has a wallet address, namely @wallet_Alice for Alice and @wallet_Bob for Bob, and that these addresses are communicated for example in the form of a QR code, before the smart contract is executed. Furthermore, Alice will have generated (in 201) a private key a and an ephemeral public key $P_a=aG$ by means of an elliptical curve cryptosystem. Similarly, Bob will have generated (in 202) a private key b and an ephemeral public key $P_a=aG$ using the same cryptosystem. Alice and Bob will more generally be able to use an asymmetric cryptosystem to generate their pairs of private and public keys.

The structure of the smart contract is shown as 250. It comprises a first function Fct A, having at least one ephemeral public key of a first peer (Alice) as an argument. It may also include the wallet address of the second peer (Bob) as an argument. When this first function is called, it stores the address of the wallet of the peer who calls it with his ephemeral public key. It also stores the wallet address of the second peer if it is sent to it as an argument.

The smart contract comprises a second function Fct B, having at least the public key of the second peer (Bob) as an argument. It may also include the wallet address of the first peer (Alice) as an argument. When this second function is called, it stores the address of the peer who calls it with his ephemeral public key. It also stores the address of the first peer if it is sent as an argument.

In order to define the contracting parties, Fct A will contain the wallet address of the second peer as an argument, or Fct B will contain the address of the first peer as an argument, these two situations obviously not being exclusive of each other.

When the first function Fct A contains the wallet address of the second peer as an argument, the Fct B function verifies that it is called by this wallet address before storing the ephemeral public key provided to it as an argument. Conversely, when the second function Fct B contains the wallet address of the first peer as an argument, the first function Fct A verifies that it is called by this wallet address before storing the public key provided to it as an argument.

The smart contract comprises a third function, Fct C, with the purpose of checking the identity of the parties that call it and sending the public keys according to distribution conditions defined in the contract. In this case, the function Fct C contains a first instruction indicating that if it is called by the wallet address of the first peer, it returns the ephemeral public key of the second peer to it. Similarly, it contains a second instruction indicating that if it is called by the wallet address of the second peer, it returns the ephemeral public key of the first peer to it.

Finally, advantageously, the smart contract contains a fourth function Fct timeout. If the second peer (Bob) has not yet called the second function within a predetermined time, timeout, after the first peer (Alice) has called the first function to save her ephemeral public key, to withdraw this ephemeral public key, the first peer can call the function Fct timeout to terminate execution of the contract, and possibly to recover her stake. Conversely, if the first peer (Alice) has not yet called the first function within a predetermined time, timeout, after the second peer (Bob) has called the second function to save his ephemeral public key, to withdraw this ephemeral public key, the second peer can call the function Fct timeout to terminate execution of the contract, and possibly to recover his stake.

The procedure for exchange of keys then takes place as follows: In step 211, Alice forms a first transaction, $T_A$, and sends it to the address (of the first function) of the smart contract. This first transaction contains Alice's ephemeral public key, $P_a$, and in the case illustrated, Bob's wallet address @wallet_Bob (also called account address in Ethereum). The first transaction is digitally signed by Alice using her private key. During execution of the first function, Alice's signature is verified by the node that executes it. Alternatively, Alice's signature can be verified by the contract itself. The wallet address of the peer that initiated the transaction, @wallet_Alice, the wallet address @wallet_Bob, and the ephemeral public key $P_a$ are saved in the smart contract. The contract is then "mined" to validate its state change.

In step 212, Bob forms a second transaction, $T_B$, and sends it to the address of the second function of the smart contract. This second transaction contains Bob's ephemeral public key, $P_b$, and is signed by Bob using his private key. As before, the signature can be checked by the node that executes the contract, or by the contract itself.

The second function compares the wallet address from which the second transaction was sent, in this case @wallet_Bob, with the wallet address stored in the contract. If they are identical, the ephemeral public key, $P_b$, is saved in the smart contract. The change in the state of the contract is then validated by mining the block that contains it.

Alice and Bob are can then send a request in the form of a transaction to the address of the smart contract, independently of each other in 221 and 222 respectively, to execute the third function, Fct C, of the smart contract. More precisely, Alice sends a transaction $T_{AC}$ to the function Fct C and Bob independently sends a transaction $T_{BC}$ to the same function.

The function Fct C compares the address of the wallet at which the transaction 221 or 222 originated with the wallet address stored in the contract, namely @wallet_Alice or @Wallet_Bob respectively. If they are identical, the smart contract returns the ephemeral public key $P_b$ to Alice or returns the ephemeral public key $P_a$ to Bob, respectively, as an argument.

Alice then calculates the secret key $aP_b=abG$ in 231 from the ephemeral public key $P_b$ that she just received from the smart contract. Bob does the same thing in 232, $bP_a=baG$, starting from the ephemeral public key of Alice that he just received. Alice and Bob thus share the secret key $k_{ab}=abG$ to secure a communication channel outside the blockchain, to secure confidentiality of the data or to use it for authentication purposes.

In the case illustrated, if Bob has not supplied his ephemeral public key $P_b$ within a predetermined time, timeout, of which he was previously informed in a procedure outside the chain, Alice can send a transaction to the fourth function Fct timeout to terminate the contract.

Preferably, the functions Fct A and Fct B are paying functions, in other words transactions 211 and 212 must transfer an amount agreed upon in the smart contract before they can be executed. In particular, this precaution can eliminate service denial attacks.

Furthermore, this sum can be restored to the parties during execution of function Fct C, when the public keys P and $P_b$ are handed over. More precisely, it could be planned that when one party successfully calls Fct C and receives the public key addressed to it, the contact returns half of their stake to the parties. Thus, each of the parties is notified when the public key that it saved in the contact is delivered to the other party. Restoration of half of the stakes is effectively an acknowledgement for the party concerned.

Optionally, transactions 211-212, 221-222 may include a parameter fixing the maximum complexity (STARTGAS parameter in Ethereum), as a number of steps or clock cycles, that execution of the transaction is allowed to consume, and a cost to be paid in terms of complexity (GASPRICE parameter in Ethereum). Addition of these parameters makes it possible to demand that each user should pay for the resources that he consumes and therefore to resist "service denial" type attacks obtained by creating infinite loops.

The second embodiment is generalised without difficulty as an exchange of keys between an arbitrary plurality of peers so that in particular they can create independent secure channels with each other in pairs.

To achieve this, Alice initiates the procedure and, in addition to her ephemeral public key, $P_a$, provides the function FctA with the parties involved in the smart contract in the form of a list of wallet addresses.

Each registered party can then identify himself with the smart contract and execute the function Fct B to store his ephemeral public key in the contract.

Finally, each party registered in the contact can execute the function Fct C and retrieve the public key of the other parties. Starting from his own private key and the public keys thus retrieved, each party can calculate a secret key shared with another party.

The following table gives an example of an exchange of keys using a smart contract between four parties Alice, Bob, Charlie and Dave.

It will be seen that due to the smart contract, six secret keys can be generated each secret key corresponding to a communication channel between two parties to the contract.

| Alice | Bob | Charlie | Dave | shared key |
|-------|-----|---------|------|------------|
| $aP_b$ | $bP_a$ | | | abG |
| $aP_c$ | | $cP_a$ | | acG |
| $aP_d$ | | | $dP_a$ | adG |
| | $bP_c$ | $cP_b$ | | bcG |
| | $bP_d$ | | $dP_b$ | bdG |
| | | $cP_d$ | $dP_c$ | cdG |

The invention claimed is:

1. A method of exchanging keys between a first user and a second user of a transaction blockchain, the blockchain being designed to store smart contracts, each of the first user and the second user has a wallet address used to send and receive transactions, wherein the blockchain contains a smart contract comprising:
   a first function having at least one public key as an argument and that, when called by the first user, stores the wallet address of the first user and the public key, as arguments;
   a second function having at least one public key as an argument and that, when called by the second user, checks that the wallet address of the second user is an address of a user authorized for the exchange, and if the wallet address of the second user is the address of the user authorized for the exchange, stores the public key as an argument;

a third function comprising a first instruction verifying that the wallet address of a calling user, the calling user being one of the first user or the second user, is the wallet address stored by the first function and, in a case that the wallet address of the calling user is verified as the wallet address stored by the first function, returns the public key stored by the second function to the calling user, and a second instruction verifying that the wallet address of the calling user is the wallet address stored by the second function and, in a case that the wallet address of the calling user is verified as the wallet address stored by the second function, returns the public key stored by the first function to the calling user; and that (i) the first user generates a first ephemeral private key and a corresponding first ephemeral public key using an asymmetric cryptosystem;

(ii) the second user generates a second ephemeral private key and a corresponding second ephemeral public key using said asymmetric cryptosystem;

(iii) the first user forms a first transaction containing the first ephemeral public key and sends the first transaction to an address of the smart contract to call the first function, the wallet address of the first user and the first ephemeral public key then being stored in the smart contract, a block containing the smart contract then being mined;

(iv) the second user forms a second transaction containing the second ephemeral public key and sends the second transaction to the address of the smart contract to call the second function, the wallet address of the second user and the second ephemeral public key then being stored in the smart contract, the block containing the smart contract then being mined;

(v) the first user forms a request in a form of a third transaction and sends the third transaction to the address of the smart contract as the calling user of the third function, the second instruction of the third function of the smart contract then returning the second ephemeral public key to the first user;

(vi) the second user forms a request in a form of fourth transaction and sends the fourth transaction to the address of the smart contract as the calling user of the third function, the second instruction of the third function of the smart contract then returning the first ephemeral public key to the second user;

(vii) the first user calculates a product of the first ephemeral private key and the second ephemeral public key and the second user calculates a product of the second ephemeral private key and the first ephemeral public key to generate a common secret key.

2. The method of exchanging keys according to claim 1, wherein the first function of the smart contract comprises the wallet address of the user authorized for the exchange as a second argument and wherein the first transaction sends the wallet address of the second user to the first function as a second argument.

3. The method of exchanging keys according to claim 1, wherein, when the smart contract returns the first ephemeral public key to the second user or the second ephemeral public key to the first user, the smart contract returns half of indicated amounts in the first and second transactions to the first and second users respectively.

4. The method of exchanging keys according to claim 1, wherein the smart contract comprises a fourth function (Fct timeout) by which the first user can terminate the smart contract if the second user has not sent the second transaction to the smart contract within a predetermined time (timeout) after the first user has sent the first transaction to the smart contract.

5. The method of exchanging keys according to claim 1, wherein the blockchain is originated from a decentralized blockchain platform having smart contract functionality.

6. The method of exchanging keys according to claim 5, wherein at least one among the first, second, third, and fourth transactions comprises a parameter fixing a maximum complexity that execution of the transaction is authorized to consume and a cost to be paid in terms of complexity.

* * * * *